July 12, 1932.  M. SIMSINOVICI  1,867,423
SHIELD FOR BATTERIES AND THEIR PARTS
Filed June 15, 1926
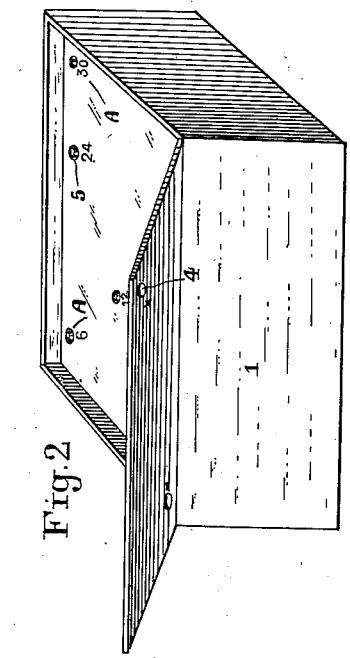
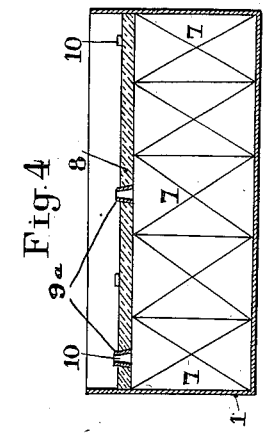
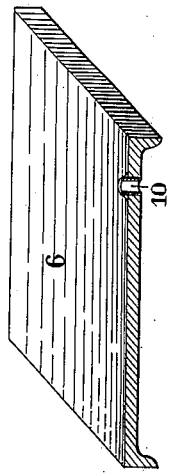
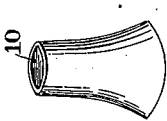
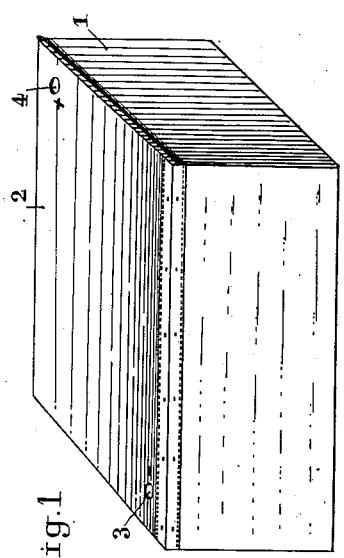
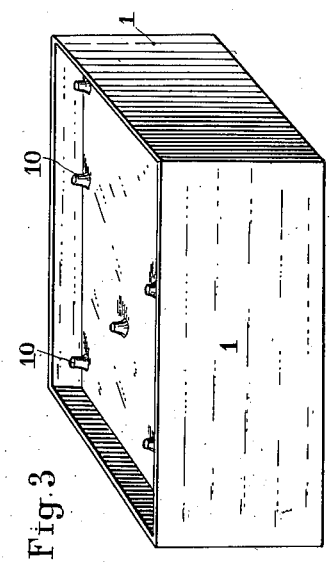
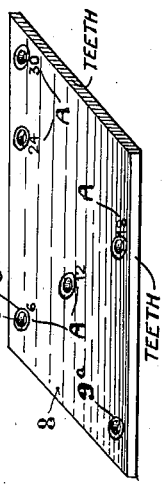
Inventor
Martin Simsinovici
BY Munn & Co
ATTY.

Patented July 12, 1932

1,867,423

UNITED STATES PATENT OFFICE

MARTIN SIMSINOVICI, OF PARIS, FRANCE

SHIELD FOR BATTERIES AND THEIR PARTS

Application filed June 15, 1926, Serial No. 116,162, and in France May 10, 1926.

My invention relates to an insulating, indicating and protecting shield for dry batteries or cells and their various parts such as contacts or the like, as well as for storage batteries and other purposes.

The dry batteries, and chiefly the batteries employed in radio receiving outfits, usually comprise a plurality of cells mounted in series and provided with contact pieces, these generally consisting of sockets corresponding to the different voltage in use. The cells are placed, as a rule, in a common box or case and are held within the box by a filling of wax or the like; after the cells have been placed in position within the box, the wax is flowed in so as to fill up the spaces between the cells and to cover them with a layer whereby they are both electrically insulated and are rigidly held in place. This method, however, requires special care for the finishing of the apparatus, as the wax or light melted material must not be allowed to enter the sockets, and further requires the use of a large amount of wax, representing a considerable expense in the manufacture, and thus the weight of the apparatus is greatly increased.

In my invention, I provide a suitable shield whereby all such disadvantages are obviated. This device is chiefly characterized by the fact that it consists of a plate of any suitable substance, such as wax, pasteboard, galalith, ebonite or celluloid, in which are formed apertures corresponding in size and position to the contact sockets. These plates are secured in place in the box of such battery, by suitable means, and in the present instance, I have illustrated teeth formed in the edges of the body of the plate adapted to engage the internal portions of the walls of the box containing the cells. In this manner I properly secure the cells in position and further insulate the same, and can provide suitable notations upon the upper surface of the plate for indicating the voltage or the like, whereby the manufacture can be more rapidly and economically effected, is rendered more attractive; and the weight of the apparatus reduced as well as presenting a more esthetic appearance.

In the accompanying drawing which shows by way of example, a device constructed in accordance with my invention as applied to a dry battery outfit for radio receiving purposes:

Figures 1 and 2 are perspective views of a battery with the cover closed and open, respectively, Figures 3 and 4 are respectively, a perspective view and a lengthwise section of a battery outfit comprising my shield, Figure 5 is a perspective view of the shield, Figure 6 is a perspective view of one of the contact sockets, Figure 7 is a sectional view of a modification.

As above indicated, in the batteries employed for radio receiving outfits, as shown in Figures 1 and 2, the battery is secured in a case 1 which is provided with a cover 2 hinged for instance, and apertured at the outer corners, as at 3 and 4, to correspond respectively to the negative and positive poles of the battery. The battery may comprise intermediate sockets 5 (Fig. 2) forming contacts for voltages below the voltage afforded by the sockets corresponding to the apertures 3 and 4. Only one of the sockets 5 is seen in said figure, the others not being visible on the cover. The sockets 5 are only accessible when the cover 2 is open, and the figures for the voltage corresponding to said sockets are printed or stamped into the plate which covers and holds the battery cells.

According to my invention, the battery cells 7 in the box are held by a plate 8 of an insulating substance, which forms a shield. This plate is preferably formed from ebonite, or similar substance, and includes various apertures 9 which correspond as to size and position to the contact sockets 10

Figs. 3 and 4) which are mounted on the battery cells 7.

To secure the plate 8 in a reliable and rigid manner, the sockets 10 are given a tapered or flaring shape, larger at the bottom, as shown in Figure 6, and the apertures 9 in the plate 8 being similarly shaped will fit tightly upon the tapered sockets 10 whereby all relative motion of the cells will be prevented, and further, the plate or shield will fit tightly within the box 1, by virtue of the teeth as indicated by the legend in Fig. 5, so as to afford a rigid connection therewith, and the set of battery cells, the box 1 and the various parts will thus form a rigid unit which will not become loose.

The sockets 5 and 10 in the present instance are shown substantially as truncated cones having a central axial bore adapted to receive and maintain a plug of an electric connector, not shown.

The plate 8 should be of a size and shape to tightly engage the walls of the box 1, so as to form a hermetic seal between the edges of the plate and the walls of the box, and the apertures 9 may be provided with a rubber ferrule 9$^a$, so as to provide a tight joint with the socket 10.

Upon the plate or shield 8 may be printed or stamped various notations, adjacent the apertures, as indicated at A which fit upon corresponding sockets, in order to indicate the voltage corresponding to said sockets.

The edges of the plate 8 may be strengthened and shaped as indicated in Fig. 7, whereby it will be better secured in place having the apertures and the lateral sides thicker and advanced in the upper part of the shield.

The invention is applicable to primary or storage batteries of all voltages and chiefly to the batteries employed for radio receiving sets, although not limited to such use and may be employed in all situations in which it is required to maintain battery cells within a common box or case in a fixed position, irrespective of the shape of the cells or box.

What I claim is:

1. A protecting plate for a dry battery having a plurality of cells provided with tapering terminal sockets and arranged in a container, said plate being of insulating material and having a plurality of tapering apertures positioned to receive the terminal sockets of the battery cells to hold said cells from movement and to indicate by their location the voltage of the battery, said plate having means at its edges to engage the walls of the container for insulating the battery cells and hermetically sealing them.

2. A battery shield as claimed in claim 1, the plate having thickened edges extending below the lower face of the body of the plate.

3. A protecting plate for a dry battery having a plurality of cells provided with tapering terminal sockets and arranged in a container, said plate being of insulating material and having a plurality of tapering apertures positioned to receive the terminal sockets of the battery cells to hold said cells from movement and to indicate by their location the voltage of the battery, said plate having its edges provided with teeth adapted to engage the walls of the container for insulating the battery cells and hermetically sealing them.

In testimony whereof I have hereunto set my hand.

MARTIN SIMSINOVICI.